United States Patent [11] 3,607,312

| [72] | Inventor | Charles Ambrosia Ready<br>Fountain Inn, S.C. |
|---|---|---|
| [21] | Appl. No. | 812,381 |
| [22] | Filed | Apr. 1, 1969 |
| [45] | Patented | Sept. 21, 1971 |
| [73] | Assignee | W. R. Grace & Co.<br>Duncan, S.C. |

[54] METHOD OF PREPARING AND PRESERVING READY-TO-EAT FOODS
4 Claims, No Drawings

[52] U.S. Cl. .................................................. 99/165,
99/171 LP, 99/215, 99/100 R, 99/107
[51] Int. Cl. .................................................. A23l 3/00,
B65b 5/00
[50] Field of Search ............................................ 99/192 R,
193, 194, 165, 171 R, 171 LP, 174, 215, 192

[56] References Cited
UNITED STATES PATENTS

| 2,623,826 | 12/1952 | Grinstead | 99/171 X |
| 3,262,787 | 7/1966 | Ellis | 99/174 |

*Primary Examiner*—Norman Yudkoff
*Assistant Examiner*—Hiram Bernstein
*Attorneys*—John J. Toney, William D. Lee, Jr. and Edward J. Hanson, Jr.

ABSTRACT: A method of preparing and preserving ready-to-eat food comprising vacuum packaging the food in a gas tight pouch, cooking the food in the pouch by immersing in hot water, rapidly chilling the food to about 30° F. but not freezing, storing at 30° F. until needed for consumption, and heating in hot water to serving temperature. A food package substantially free of pathogens results from the method.

METHOD OF PREPARING AND PRESERVING READY-TO-EAT FOODS

BACKGROUND OF THE INVENTION

1. Field of the Invention

This invention relates to a method of preparing and preserving ready-to-eat foods. More particularly, the invention relates to cooking and storing foods in a ready-to-eat condition for extended periods of time. The invention also relates to a food package particularly adaptable to the aforementioned method.

2. Description of the Prior Art

The increased cost of labor makes the preparation of food by labor-saving mass-production techniques increasingly more attractive where the food so prepared can be stored until it is ready for consumption. Unfortunately, most precooked and stored foods have heretofore suffered from a lack of flavor, aroma, and succulence which greatly inhibits their appeal to the consumer. Among the better known of the prior art, precooked foods are the so-called "TV dinners" which have been cooked, frozen, thawed, and heated before serving. In addition to being sold as a convenience item in grocery stores for individual consumption, these precooked foods have been investigated by institutions such as hospitals, sanitariums, and the like as a means of reducing labor cost while providing sanitary and taste-appealing food. Numerous cooking, freezing, and reheating processes have been tried but none of these have produced an entirely satisfactory precooked food.

One promising prior art approach has been to vacuum package hot, cooked foods in plastic bags, sterilize the packaged food by immersing in boiling water, and then chill and store at 37° F. or less. After storage of up to several weeks the food can be heated for serving by immersing it in heated water. There are several deficiencies in this and other prior art methods which leave the food less desirable than it would be if freshly and properly cooked. Prominent among these deficiencies is the cooking of the food at elevated temperatures which drives off the natural, aromatic flavors of the food and, in the case of meats, the natural enzymes present which tend to tenderize the meat as cooked are destroyed or evaporated when the interior temperature of the meat exceeds the 140° F. to 160° F. range. Thus, it is an object of the present invention to precook foods at temperatures which do not impair the retention of natural flavors or tenderizing effect of natural enzymes.

Another deficiency in the prior art is that in addition to elevated cooking temperatures, the sterilizing temperature tends to further reduce the beneficial effects of the natural flavors and enzymes. Sterilization usually is carried out at the temperature of boiling water or higher in order to destroy all organisms which might cause the food to spoil or which might produce toxins. Therefore, it is another object of the present invention to provide a method of preserving and storing precooked foods which does not require sterilization at boiling water temperatures or greater.

Still another deficiency in the prior art is that the foods are cooked prior to being vacuumized and sealed thereby allowing the natural flavors, juices, and aromas to escape. Thus, it is another object of the present invention to provide a method in which natural flavors and juices are preserved in the package.

Yet another deficiency in the prior art is that vacuum packaged foods are packaged at relatively low vacuums of the order of a few inches of mercury. While a low vacuum will remove some of the undesirable residual gases, it has been discovered that packaging at the highest vacuum allowable for each particular food product will result in greater storage lifetime and preservation of flavor. It is thought that of the residual gases, oxygen is prominent in promoting undesirable chemical reactions or making possible the growth of organisms which cause deterioration of foods. Thus, it is another object of the present invention to provide a method of preserving food utilizing vacuum packaging at vacuums great enough to remove a substantial portion of oxygen and other gases entrapped within the food and package.

Still another deficiency in the prior art is that foods which have been frozen require a thawing period which consumes time and, in addition, adds to the further deterioration of the food since the outer surface of the food will be quite warm for a period of time during which the interior is still frozen. Freezing also causes undesirable texture changes in many foods. Thus, an object of the present invention is to provide a method of preserving and preparing foods which does not require freezing and thawing and which permits the foods to be rapidly brought to serving temperatures.

The accomplishment of the aforementioned objects by the present invention can be better understood by the following summary of the invention and by the detailed description and examples.

SUMMARY OF THE INVENTION

In its broadest aspect the present invention comprises a method of preparing and preserving ready-to-eat foods for extended periods of time. This can be generally achieved by vacuum packaging the food in a relatively gas impervious container at a high vacuum, preferably the maximum vacuum allowable, heating the packaged food to cook it if it is uncooked or to kill pathogens if it is precooked, cooling rapidly but not freezing, and storing at a temperature in the range from 28° to 32° F. until ready for use. In this invention the food is preferably uncooked prior to vacuum packaging and is cooked within the package thus preserving its natural flavor and succulence. The maximum vacuum allowable is dependent upon the nature of the particular food and its temperature and is determined by the boiling point of the moisture within the food. The vacuum drawn, therefore, should be less than the saturation pressure of the liquid in the food. Usually, this vacuum will be in the range from 10–29 in. Hg. Microwave heating and gas or liquid heating and cooling can be employed in the invention.

In a more limited aspect, the present invention includes cooking the vacuum packaged food by immersing the packaged food in heated water for the necessary period of time, and subsequently immersing the packaged food in chilled water to reduce its temperature. Thereafter, the packaged food is stored at approximately 30° F. until it is ready to be served. To bring to serving temperature, the packaged food is immersed in heated water. When serving temperature is reached, the packages are opened, and the food placed on plates and served.

When cold, uncooked foods are vacuum packaged the vacuum drawn is preferably at least 15 in. Hg. and may be 29 in. Hg. or higher. A preferred container is a pouch or bag for vacuum packaging which has low gas permeability and is made from a polyethylene/nylon laminate. This laminate is readily heat sealable. Thus, in another limited aspect, the present invention includes a package comprising cooked food which is enclosed in a vacuum sealed pouch, said vacuum being at least 15 in. Hg.

The extended storage period, 90 days and more, made possible by the present invention is due to the relative absence of pathogens in the food. When uncooked food is cooked in the vacuumized bag substantially all the pathogenic organisms are destroyed. The food is quickly chilled to approximately 30° F. and stored at this temperature. At this temperature no pathogenic organisms will grow. If food which has been fully or partially cooked is to be stored, then it must be heated after it has been vacuum packaged in order to destroy the pathogens.

The invention may be better understood by the following detailed description and examples.

DEFINITIONS

The vacuum measurements used herein are in units of inches of mercury with 0 inches being the pressure of 1 atmosphere of air or 14.7 lbs./sq. in. A vacuum of 5 inches, for example, represents actually a pressure 5 inches of Hg below atmospheric. The higher the vacuum, the greater the pressure below atmospheric.

Maximum allowable vacuum as used herein means the greatest vacuum which can be drawn on the food in the package during the packaging process without vaporizing the liquid or moisture naturally present in the food. This vacuum will be essentially the same as the saturation pressure at the particular temperature of the food. For meat, the maximum allowable vacuum is the vacuum where the blood and other fluids in the tissue would be vaporized, and this vacuum would not be great for a meat heated to above 200° F., but would be large, greater than 29 inches, for a meat at 30° F.

Pathogenic organisms or pathogens as used herein mean virus, fungus, bacteria, etc. which can cause disease or sickness to humans if present in ingested food.

DETAILED DESCRIPTION

In one preferred method of performing the present invention, meat, vegetables, or fruit are prepared for cooking and placed within a pouch along with the desired seasoning ingredients. The pouch is preferably constructed of a nylon and polyethylene laminate. The maximum vacuum is drawn on the package after which it is heat sealed or sealed with a clip. This vacuum can be greater than 29 inches. The package is then placed in a heated water bath maintained between 130° and 212° F. After cooking, the package is chilled in an ice water bath and then stored at 30° F.±2°. Storage times of 90 days and greater are possible. After storage, the food can be brought quickly to serving temperatures by immersing the package in a bath of hot water ranging between 140° F. to 212° F. for a short period of time. The food is now ready to eat, and the package can be opened and the food served. For the final heating before serving, a microwave oven could be used.

Package sizes can range from a content weight of only a few ounces to a weight of more than 60 pounds. Generally, it is desirable to place a quantity in a package which would be one to five serving portions. Usually it is desirable to prepare meat, vegetables, potatoes, and fruit in separate packages as their cooking time varies. However, a package could be compartmentalized, or the vegetables wrapped separately from the meat within the same package. For stews and casseroles, of course, the meats, vegetables, noodles, potatoes, macaroni, etc. will be cooked together.

For some foods such as fried chicken, a small amount of precooking or frying will be necessary to give the skin its crispness and fried flavor. Complete cooking will then be carried out in the package. Some crispness might be lost during storage, but this can be restored by a very short exposure to microwave heating or dipping the chicken in hot cooking oil.

Other foods also require a small amount of precooking or preparation to obtain their characteristic appearance for serving. Steaks can be seared or exposed to charcoal grilling for a length of time necessary to create the surface appearance of a fully cooked steak.

Cooking in the package or hating if fully cooked will destroy the pathogens present. The storage of the cooked food in the range from 28° F. to 32° F. is at a temperature at which pathogens will not grow and toxins will not be produced, and the food will not freeze.

The pouches generally have an oxygen permeability in the range from 25 to 250 cc./24hrs./atms. m²/mil. Single layer pouches will have thickness from 1 to 4 mils and laminated pouches have a thickness from 2 to 5 mils. Even though the pouches have low gas permeability over a period of time the vacuum will diminish somewhat. It is thought that this slow rate of leakage is a limiting factor on storage.

Equipment which can be used are pouch vacuum packaging units, pressurized dip tank for cooking and reheating, vacuum clipper units, and a vacuum pump, all of which are commercially available.

Pouches can be preferably made from a laminate of Mylar and polyethylene, nylon and polyethylene, or saran and polyethylene. The inner layer in pouches made from these laminates is polyethylene which can be heat sealed to itself for those instances in which a heat seal closure rather than a clipped closure is desired. When the pouches have been vacuum sealed and cooking or heating has been performed, the resulting food package is substantially free of pathogens and capable of extended storage.

In some instances, particularly for large cuts of meat which are more savory and succulent when cooked as a whole, it may be desirable to cook the entire cut in a vacuum package, open the package, divide the cut into serving portions, and repackage in a vacuumized pouch. Since the opening and repackaging can introduce pathogens, the package must be reheated until its internal temperature reaches the 130°–160° range and pathogens are destroyed. This is a pasteurization process and if a lower temperature is used then the heating period will be longer.

EXAMPLE I

Sliced beef pot roast was vacuum packaged in six nylon polyethylene pouches with each pouch containing five serving portions. The pot roast was packaged cold, less than 40° F.; and, the maximum allowable vacuum was drawn. At this temperature, the vacuum was approximately 29 inches. After sealing, the pot roast was cooked in water held at 180° F. for 40 minutes. The packages were then chilled and placed in cold storage held at between 28° to 32° F. After 10 days the packages were withdrawn from storage, heated in 180° F. water for 8 minutes, opened, and sampled. The tenderness and taste were very good.

EXAMPLE II

Canadian bacon was packaged the same as the pot roast in Example I except that the Canadian bacon was cooked for only 20 minutes in the 180° F. water. The same storage conditions and reheating for serving were used. After 10 days the flavor and taste appeal were excellent.

EXAMPLE III

Round steak with prepared brown gravy was vacuum packaged and cooked 30 minutes in 180° F. water. After chilling, storing at 30° F. for 6 days, and reheating in 180° F. water for 8 minutes, the tenderness and flavor were excellent.

EXAMPLE IV

Ham a la king was vacuum packaged at maximum allowable vacuum and cooked 40 minutes at 180° F. After chilling and storing for 12 days at 30° F., the ham a la king was reheated and sampled. The flavor was excellent.

EXAMPLE V

A whole, 18 lb. turkey was placed in a saran casing, the maximum vacuum drawn, the package sealed by clipping, and the turkey cooked by immersing the sealed package in 170° F. water for 6½ hours. After chilling and storing for 90 days at about 30° F., the flavor and tenderness were excellent. It appears that storage times greater than 90 days are readily obtainable.

Numerous vegetables were tried and the results with these were generally excellent. Vegetables as a rule required longer cooking periods than did the meats. However, the vegetable cooking time varies with regional preference.

Several meats were precooked slightly such as chicken being prefried for about 5 minutes in 350° F., oil and then cooled before packaging. The final cooking was done in the package. Roast beef was seared before cooking, and in one comparison a 3-pound roast cooked in a conventional oven shrank 37.5 percent while a 3-pound roast cooked in the vacuum sealed bag shrank only 29 percent.

Comparisons were made with other storage methods such as packaging a cooked food and then not reheating but chilling and storing. Food packaged in this manner showed considerable microbe growth when examined. Packages prepared according to the present invention showed little or no microbe survival.

I claim:

1. A method of preparing and preserving ready-to-eat foods comprising:
   a. providing uncooked, edible food for preparation;
   b. vacuum packaging said food in a relatively gas impervious pouch at a vacuum between 10 to about 29 inches of Hg;
   c. immersing said package in water maintained in the range between 130° to 212° F. until said food is cooked;
   d. removing the food from said packages after removing the packages from said water;
   e. repackaging said food into at least one similar package, said repackaging being in relatively gas impervious pouches at a vacuum between 10 to about 29 inches of Hg;
   f. reheating the food in said packages to a temperature of at least 130° F. for a period of time sufficient to destroy pathogenic organisms; then,
   g. immediately immersing said package in chilled water to bring the temperature of the food into the range of 28° F. to 32° F.;
   h. maintaining said food at a temperature in the range of 28° F. to 32° F., until needed for consumption;
   i. immersing said package in hot water maintained between 140° F. and 212° F. to bring the food to serving temperatures;
   j. removing said food from hot water and opening said packages; and
   k. placing said food upon plates and serving.

2. The method of claim 1 wherein both the larger and smaller pouch are constructed from flexible, laminated thermoplastic materials.

3. The method of claim 2 wherein both larger and smaller pouches are vacuum sealed by clipping.

4. The method of claim 2 wherein said pouches are heat sealable and the larger pouch is vacuum sealed by clipping and the smaller pouch is vacuum sealed by heat.